US008010773B2

(12) United States Patent
Bostanci et al.

(10) Patent No.: US 8,010,773 B2
(45) Date of Patent: Aug. 30, 2011

(54) HARDWARE CONSTRAINED SOFTWARE EXECUTION

(75) Inventors: Hakki Tunc Bostanci, Redmond, WA (US); Nathan Jeffrey Ide, Bothell, WA (US); Matthias Hermann Wollnik, Seattle, WA (US); John Richard McDowell, Seattle, WA (US); Karan Singh Dhillon, Renton, WA (US); Aaron Payne Goldsmid, New York, NY (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 12/144,699

(22) Filed: Jun. 24, 2008

(65) Prior Publication Data

US 2009/0319761 A1     Dec. 24, 2009

(51) Int. Cl.
G06F 7/38       (2006.01)
G06F 9/00       (2006.01)
G06F 9/44       (2006.01)
G06F 15/00      (2006.01)

(52) U.S. Cl. ........................................ 712/226; 712/228
(58) Field of Classification Search .................... 712/226
See application file for complete search history.

(56) References Cited

U.S. PATENT DOCUMENTS

| 5,892,899 | A  | 4/1999 | Aucsmith et al. |
| 6,069,647 | A  | 5/2000 | Sullivan et al. |
| 6,175,925 | B1 | 1/2001 | Nardone et al. |
| 6,178,509 | B1 | 1/2001 | Nardone et al. |
| 6,205,550 | B1 | 3/2001 | Nardone et al. |
| 6,230,307 | B1 | 5/2001 | Davis et al. |
| 6,453,470 | B1 | 9/2002 | Gazda et al. |
| 7,085,670 | B2 | 8/2006 | Odom et al. |
| 7,249,351 | B1 | 7/2007 | Songer et al. |
| 2005/0144471 | A1 | 6/2005 | Shupak et al. |
| 2006/0101047 | A1 | 5/2006 | Rice |
| 2007/0083738 | A1 | 4/2007 | Fischer |

FOREIGN PATENT DOCUMENTS

GB      2382891 A      6/2003

OTHER PUBLICATIONS

Forrest et al.; Building Diverse Computer Systems; 1997; IEEE Workshop on Hot Topics in Operating Systems.*
Barrantes, et al., "Randomized Instruction Set Emulation to Disrupt Binary Code Injection Attacks", Conference on Computer and Communications Security, Proceedings of the 10th ACM conference on Computer and communications security, Date: Oct. 27-30, 2003, 10 Pages, Publisher: ACM Press New York, USA.
Schellekens, et al., "Remote Attestation on Legacy Operating Systems with Trusted Platform Modules", Electronic Notes in Theoretical Computer Science (ENTCS), Date: 2008, pp. 59-72, vol. 197, Issue: 1, Publisher: Elsevier Science Publishers B. V. Amsterdam, The Netherlands, The Netherlands.
Seshadri, et al., "Pioneer Verifying Code Integrity and Enforcing Untampered Code Execution on Legacy Systems", ACM Symposium on Operating Systems Principles, Proceedings of the twentieth ACM symposium on Operating systems principles, date: Oct. 23-26, 2005, 16 Pages, Publisher: ACM Press New York, USA.

* cited by examiner

*Primary Examiner* — Corey S Faherty

(57) ABSTRACT

Restricting execution by a computing device of instructions within an application program. The application program is modified such that execution of the selected instructions is dependent upon a corresponding expected state of one or more hardware components in the computing device. In an embodiment, the application program is modified to place the hardware components in the expected states prior to execution of the corresponding selected instructions. Creating the dependency on the hardware components prevents the unintended or malicious execution of the selected instructions.

19 Claims, 6 Drawing Sheets

HARDWARE CONSTRAINED SOFTWARE EXECUTION

BACKGROUND

Applications programs frequently come under attack by malicious parties who attempt to gain unauthorized access to source code or functionality (e.g., by reverse engineering). Such malicious parties attempt, for example, to perform a static analysis of individual functions within the application program to identify and execute a particular piece of code outside the intent of the developer. Preventing such an attack, decreasing the ease of the attack, and/or increasing the cost and time to perform the attack help to protect the rights of the developer of the application program.

SUMMARY

Embodiments of the invention restrict execution by a computing device of functions within an application program. An expected state of a hardware component within the computing device is defined. At least one instruction associated with the application program is selected. The selected instruction is modified to be dependent on the defined, expected state of the hardware component for execution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
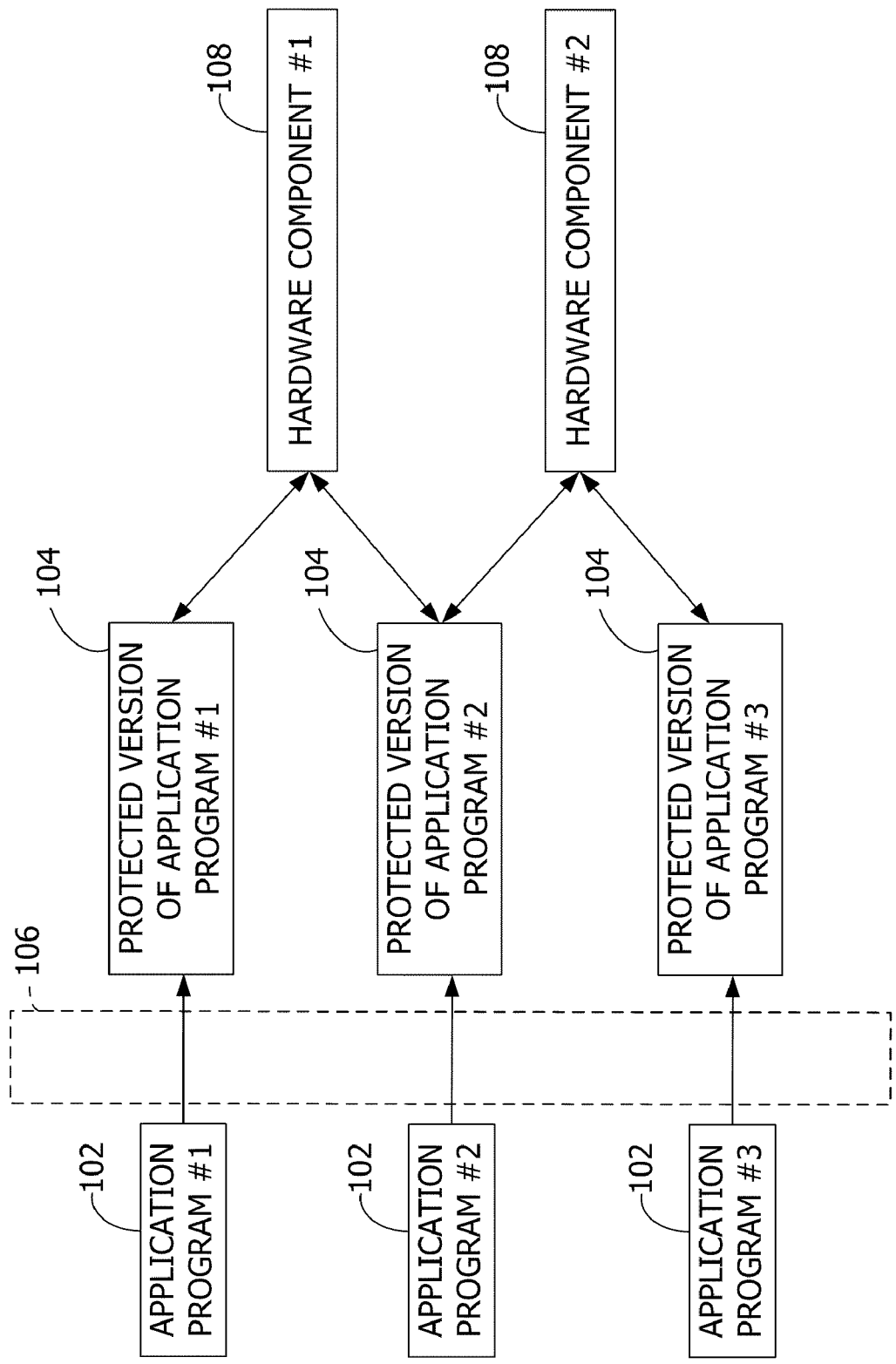
FIG. 1 is an exemplary block diagram illustrating the transformation of application programs to protected versions of the application programs dependent on hardware components.

Embodiments of the invention constrain execution of instructions within an application program 102 such as shown in FIG. 1. In some embodiments, execution of a portion of code within the application program 102 is made dependent upon, or tied to, execution of another portion of code (e.g., all code before it). Such a dependency attempts to minimize an attacker's capacity to circumvent intended execution of the application program 102. As shown in FIG. 1, application programs such as application programs #1, #2, and #3 are transformed into protected versions 104 of the application programs such as protected versions #1, #2, and #3, respectively. Some or all of application programs #1, #2, and #3 (or portions thereof) may be in source code form or post-compilation binary form. The protected versions 104 are dependent upon one or more hardware components 108 such as hardware components #1 and #2. In some embodiments, the protected versions 104 have therein one or more called and calling functions 308 that are modified in accordance with, for example, the operations illustrated in FIG. 2. For example, a tool 106 may operate on all the functions 308 in the application programs or on a subset of the functions 308.

Different functions 308 or groups of functions 308 within one or more of the application programs may be protected by the same hardware component 108 or by different hardware components 108. In the example of FIG. 1, protected version #1 is dependent on hardware component #1, protected version #2 is dependent on hardware components #1 and #2, and protected version #3 is dependent on hardware component #2.

The transformation of the application programs into the corresponding protected versions 104 occurs, for example, via a computer-executable logic embodied in the tool 106. The instrument or tool 106 may or may not include a user interface to facilitate configuration of and display output from the tool. Operation of the tool 106 is described next with reference to FIG. 2.

Figure 2:
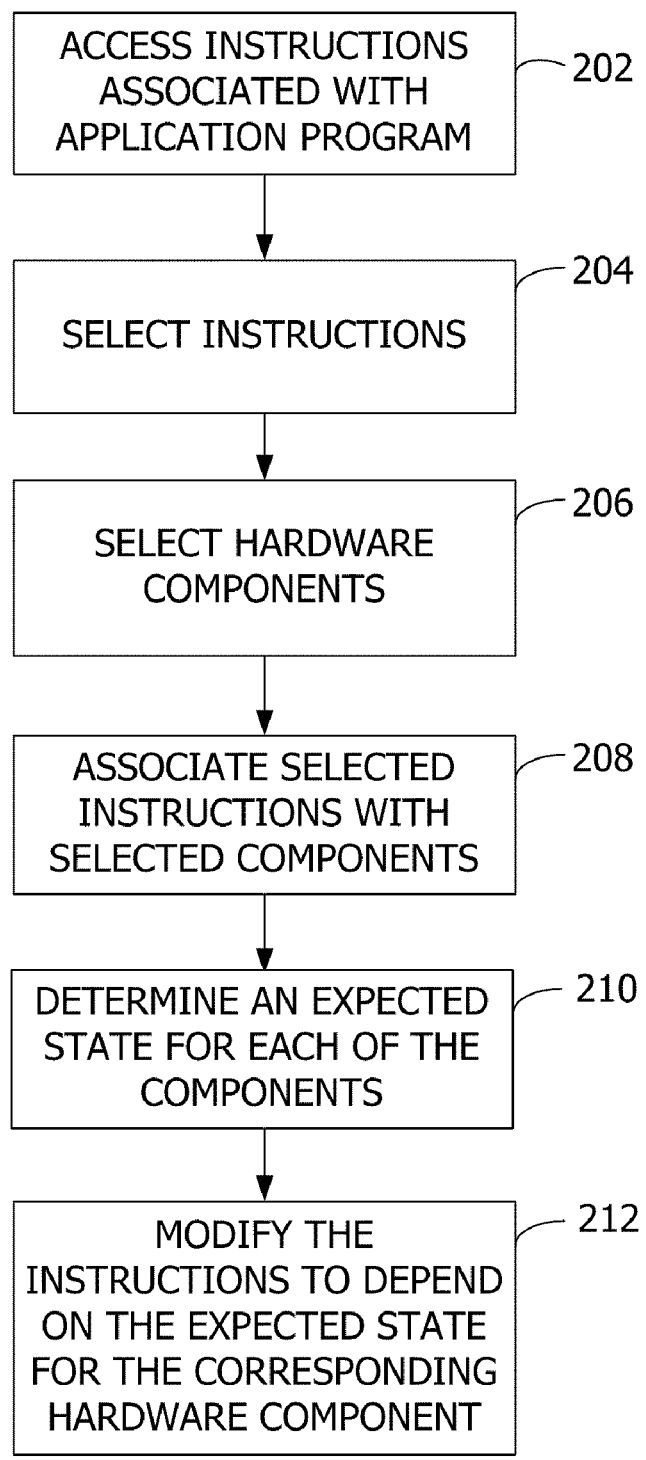
FIG. 2 is an exemplary flow chart illustrating modification of instructions within an application program to be dependent on hardware components.

Referring next to FIG. 2, an exemplary flow chart illustrates modification of instructions within the application program 102 to be dependent on the hardware components 108 within a computing device 302. Instructions associated with the application program 102 are accessed at 202. For example, the instructions may be in the form of source code or object code. One or more of the instructions are selected at 204. For example, the instructions are selected randomly, selected according to a particular type of functionality performed (e.g., related to security or access), or selected from a plurality of instructions identified by the developer as suitable or desirable for protection. For each of the selected instructions, one or more hardware components 108 associated with the computing device 302 are selected at 206. The state of each of the hardware components 108 may change over time as application programs 102 execute on the computing device 302. The selected instructions are associated with or bound to the selected hardware components 108 at 208. At 210, an expected execution state is determined, assigned, or otherwise defined for each of the selected hardware components 108. The determined, expected state includes, for example, a value for one or more of the hardware components 108 (e.g., a value stored in a register), a particular selection or organization of the hardware components 108 (e.g., assigning parameters of instructions to selected registers), any configurable state of the hardware components 108, or any combination of the foregoing. For example, the expected state is tied to the serial numbers of one or more of the selected hardware component 108. In another example, the expected state corresponds to statistical information such as a minimum quantity of packets received by a network interface card. In yet another example, the expected state is tied to the existence of functionality within a programmable hardware component (e.g., a field programmable gate array loaded with a selected instruction set).

In some embodiments, the expected state is determined by any of the following: user input, a given algorithm, randomly, and arbitrarily. For example, after observing the state changes of a selected hardware component 108 during execution of each of the instructions or functions 308 in the application program 102, the expected state is assigned to be the observed state. Such an embodiment reduces the likelihood that one of the functions 308 in the application may be executed out of context by an attacker. Table 1 below lists exemplary hardware state dependencies.

TABLE 1

Exemplary Hardware State Dependencies.

| Hardware State Dependency | Exemplary Modification |
| --- | --- |
| Assign processor registers to specific values | Reference set registers as part of calculations that involve constants (e.g., immediate values, memory addresses, offsets, etc) |
| Assign parameters of instructions to specific processor registers | Alter instructions based on mapping of original register organization to new register organization |
| A programmable processor is in a specific state | Force code to utilize programmable processor to offload functionality or include the processors capabilities in constant calculations |
| A programmable FPGA has been loaded with a specific state | Force code to utilize programmable processor to offload functionality |
| A programmable processor has been loaded with a specific instruction set | Translate binary instructions into new instruction set |

Each of the selected instructions is modified at 212 to depend on the determined, expected state of the associated hardware components 108 for execution. Creating such a dependency restricts execution traces and generally obfuscates the application program 102 (e.g., creating the protected version 104 of the application program 102). For example, an attacker cannot determine in isolation what a portion of obfuscated code does without emulating all instructions and expected hardware state transformations preceding the given piece of code. Aspects of the invention broaden the set of hardware devices and state used to determine what would otherwise be constant data or code flow.

The mode of execution of the application program 102 intended by the developer thus depends on the state condition of each of the selected hardware components 108. If the state of the hardware components 108 is equivalent to the expected state, execution of the protected version 104 of the application program 102 proceeds as intended. If the state of one or more of the hardware components 108 is not equivalent to the expected state, execution of the protected version 104 of the application program 102 is suspended, or an alternate mode of execution occur. For example, the protected version 104 of the application program 102 may then notify the developer or other entity that a malicious party has attempted to execute a portion of the protected version 104 of the application program 102 outside of the intended mode of execution.

In some embodiments, state instructions are generated for each of the selected instructions based on the expected state of the selected hardware components 108. The state instructions, when executed, transform or confirm the execution state of the associated hardware components 108. For example, if the hardware component 108 is a register and the expected state is a defined hash value, the state instructions generate the hash value and store the generated hash value in the register. In another example, the state instructions confirm that the register is storing the defined hash value. The application program 102 is modified such that the state instructions are executed prior to execution of the instructions that require the expected state. For example, functions such as functions 308 that call the selected instructions are identified and modified to execute the generated state instructions prior to calling the corresponding selected instructions.

Figure 3:
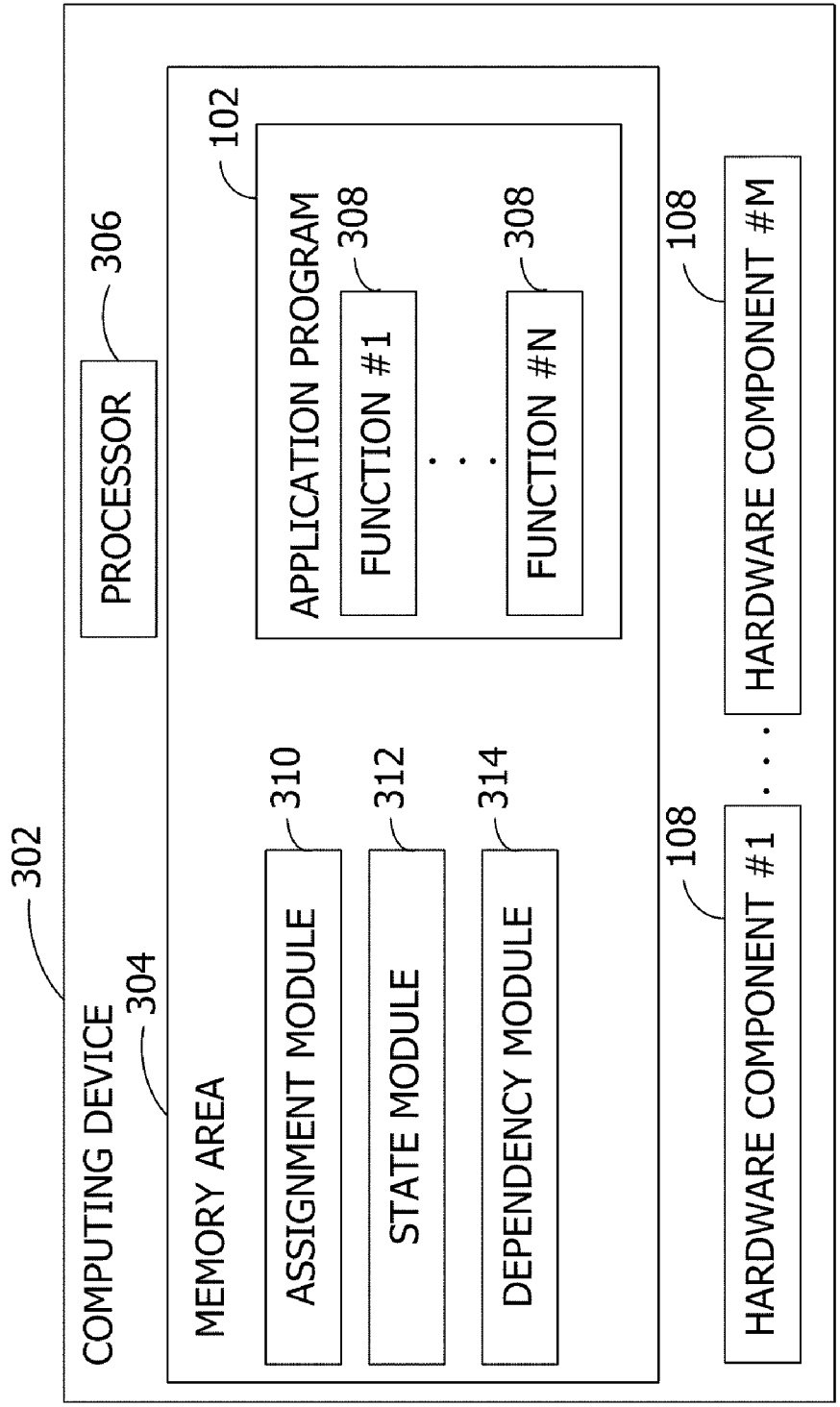
FIG. 3 is an exemplary block diagram illustrating a computing device having a memory area and other hardware components.

Referring next to FIG. 3, an exemplary block diagram illustrates the computing device 302 having a memory area 304 and other hardware components 108. FIG. 3 illustrates an exemplary operating environment for restricting execution of portions of the application program 102. The computing device 302 includes, or otherwise has access to, the memory area 304, a processor 306, and one or more of the hardware components 108 such as hardware component #1 through hardware component #M, where M is a positive integer value. In some embodiments, the hardware components 108 include, but are not limited to, one or more of the following: a processor such as processor 306, a field-programmable gate array (FPGA), a register, a trusted platform module (TPM), a programmable processor, a smartcard, a read-only-memory (ROM) chip accessible via software, and accessible clock chips (e.g., for time signals). In general, aspects of the invention are operable with any hardware state exposed by subsystems in the computing device 302 (e.g., network card status information, statistical information, etc.). The TPM, for example, creates hash values for arbitrary regions in memory. The hash values are used as a hardware state. The memory area 304 stores the application program 102. The application program 102 has one or more of the functions 308 such as function #1 through function #N, where N is a positive integer value. Each of the functions 308 executes one or more instructions.

The memory area 304 also stores one or more computer-executable modules or components for implementing embodiments of the invention. For example, execution of the modules protects the application program 102 from an unintended mode of execution on the computing device 302. In the example of FIG. 3, the memory area 304 stores an assignment module 310, a state module 312, and a dependency module 314. The assignment module 310 associates the hardware components 108 with the functions 308. The state module 312 defines the expected states for the hardware components 108. In some embodiments, the state module 312 observes execution of the application program 102 to define the expected states. The dependency module 314 modifies the functions 308 to execute their instructions only if the run-time execution states of the associated hardware components 108 are equivalent to the defined expected states. If any of the execution states are not equivalent to the expected states, a notification or error is generated, or other alternative instructions are executed. For example, the altered program will not execute correctly, or the alternative instructions may notify an entity associated with the developer of the application program 102.

In a further example, the alternative instructions may also capture as much information about the user attempting to execute the protected version 104 of the application program 102 maliciously and send the captured information to the entity. In some embodiments, the dependency module 314 modifies the functions 308 to execute the alternative instructions if any of the execution states are not equivalent to the expected execution states. For example, the dependency module 314 generates states instructions to transform the execution states, or confirm the execution states, and modifies the application program 102 to execute the state instructions prior to executing the corresponding functions 308.

The processor 306 is programmed, or otherwise configured, to execute computer-executable instructions such as those illustrated and described with reference to FIG. 4.

Figure 4:
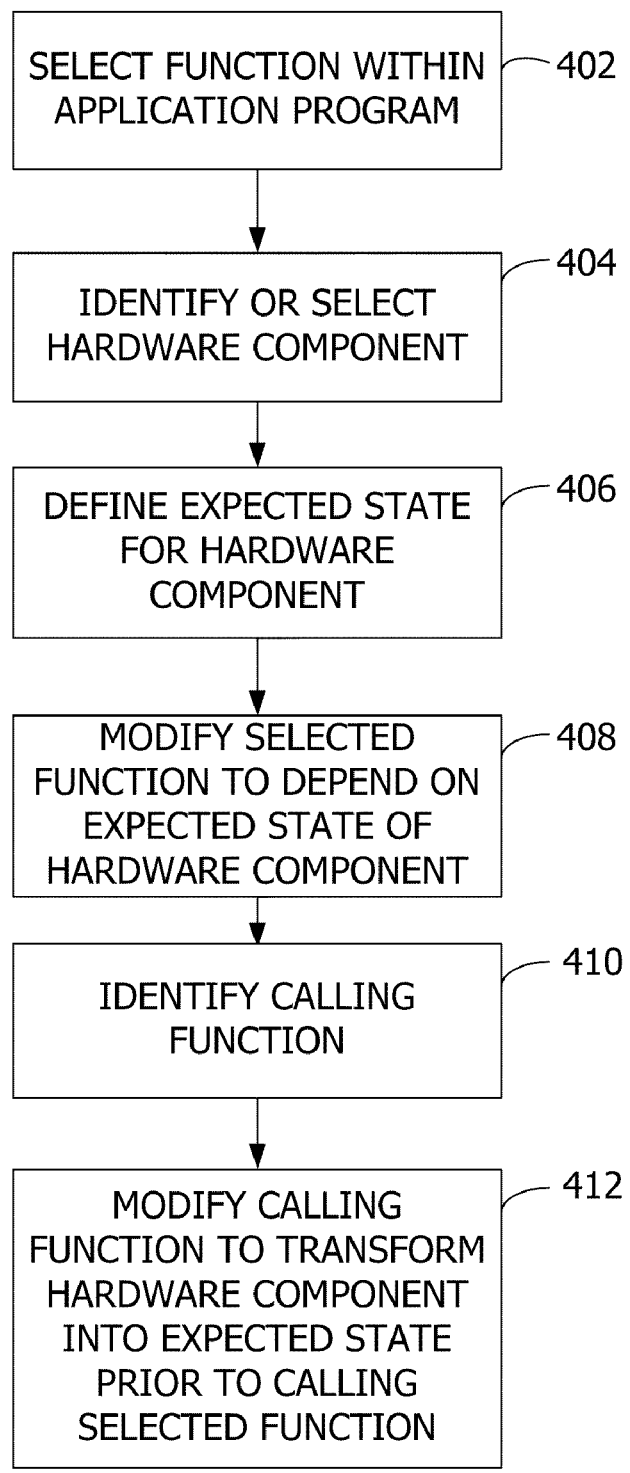
FIG. 4 is an exemplary flow chart illustrating modification of a calling function to place a hardware component into a predefined state prior to calling another function for execution.

Referring next to FIG. 4, an exemplary flow chart illustrates modification of a calling function to place the hardware component 108 into a predefined state prior to calling another function for execution. At 402, a first function is selected from a plurality of functions associated with the application program 102. At least one of the hardware components 108 is identified at 404. An expected state is defined for the identified hardware component 108 at 406. The first function is modified at 408 to depend on the defined, expected state of the identified hardware component 108 for execution. For example, the first function may be modified by adding a parameter or argument to the function call. The added argument corresponds to the expected state.

A second function that calls the first function is identified from the plurality of functions associated with the application program 102 at 410. The second function is modified at 412 to transform an execution state of the identified hardware component 108 into the defined expected state prior to calling the first function.

Because each protected function uses its own assigned hardware state as a basis for the new hardware state, an attacker cannot simply extract or analyze an arbitrary function from a binary of the protected version 104 of the application program 102 and execute it. For example, embodiments of the invention force an attacker to attempt to reverse engineer large sections, if not all, of a binary (e.g., state elements and their interaction) instead of being able to focus on one function.

Figure 5:
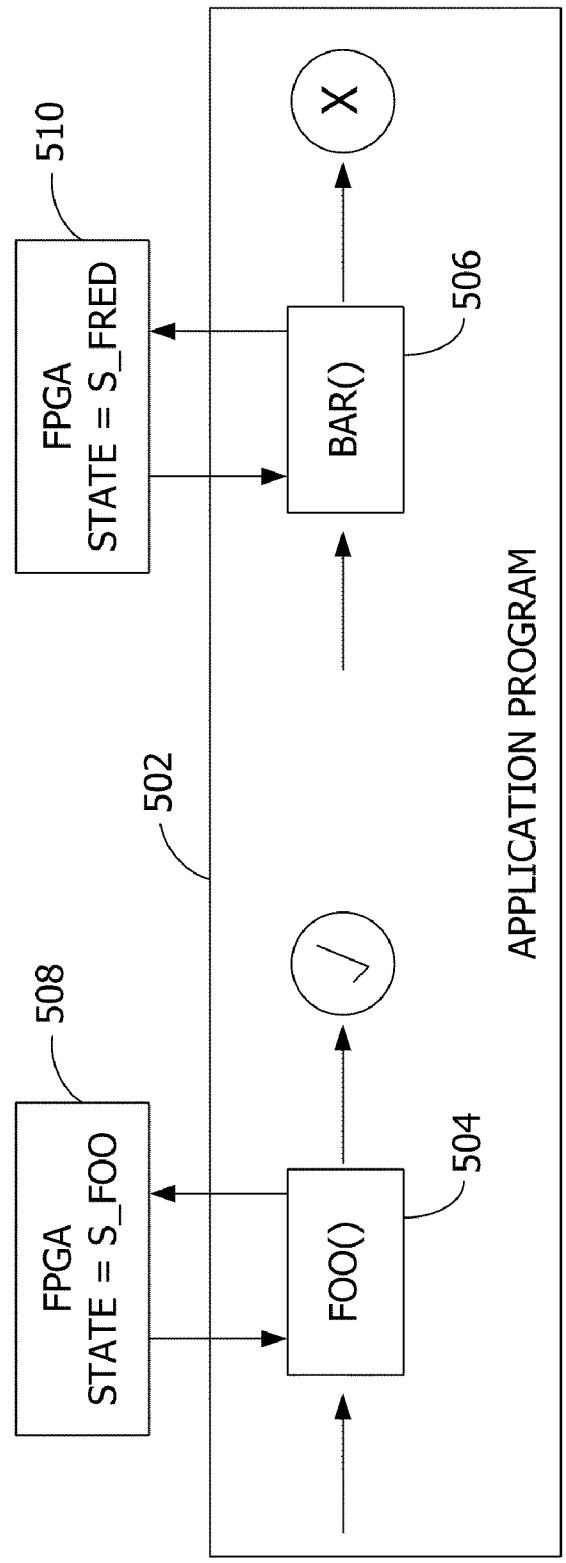
FIG. 5 is an exemplary block diagram illustrating the dependency of functions on a state of a hardware component for execution.

Referring next to FIG. 5, an exemplary block diagram illustrates the dependency of functions 504, 506 in an application program 502 on a state of the hardware component for execution. In the example of FIG. 5, the hardware component is an FPGA 508, 510. As known in the art, the FPGA 508, 510 is a semiconductor device having programmable logic components and programmable interconnects. The components and interconnects are programmable (and re-programmable) during or after FPGA manufacturing to implement any logical function. In the example of FIG. 5, the application program 502 has been programmed with functions Foo( ) 504 and Bar( ) 506. Application program 502 may have any quantity of functions 308, and is not limited to the two illustrated functions 504, 506. Further, while functions Foo( ) 504 and Bar( ) 506 are depicted without arguments for clarity, Foo( ) 504 and Bar( ) 506 may or may not have arguments.

In the example of FIG. 5, Foo( ) 504 is dependent on the FPGA 508 having an expected state of S_FOO to execute correctly (e.g., as indicated by the original or unprotected version of the application program 502). If the FPGA 508 is in the state expected by Foo( ) 504 as shown in FIG. 5, Foo( ) 504 then executes correctly.

At some point after Foo( ) 504 has finished execution, Bar( ) 506 may attempt to execute. At the time of execution of Bar( ) 506, the FPGA 510 may have transformed to another state S_FRED. FPGA 508 and FPGA 510 may be the same hardware component 108, or may represent different hardware components 108. For the purpose of illustrating the different states at different times, the FPGA 508 and FPGA 510 have different reference characters. If Bar( ) 506 is dependent on FPGA 510 having an expected state of S_BAR, Bar( ) 506 will not execute correctly (e.g., as indicated by the original or unprotected version of the application program 502) because FPGA 510 has a state of S_FRED. The unexpected state S_FRED may occur, for example, if an attacker embedded subversive instructions or data into the application program 502 for malicious purposes, or if the attacker attempted to execute Bar( ) 506 without executing one or more functions in application program 502 prior to Bar( ) 506. Thus, protection of the application program 502, or the correct or expected behavior of functions 504 and 506, may be tied to the state of the FPGA 508, 510.

Figure 6:
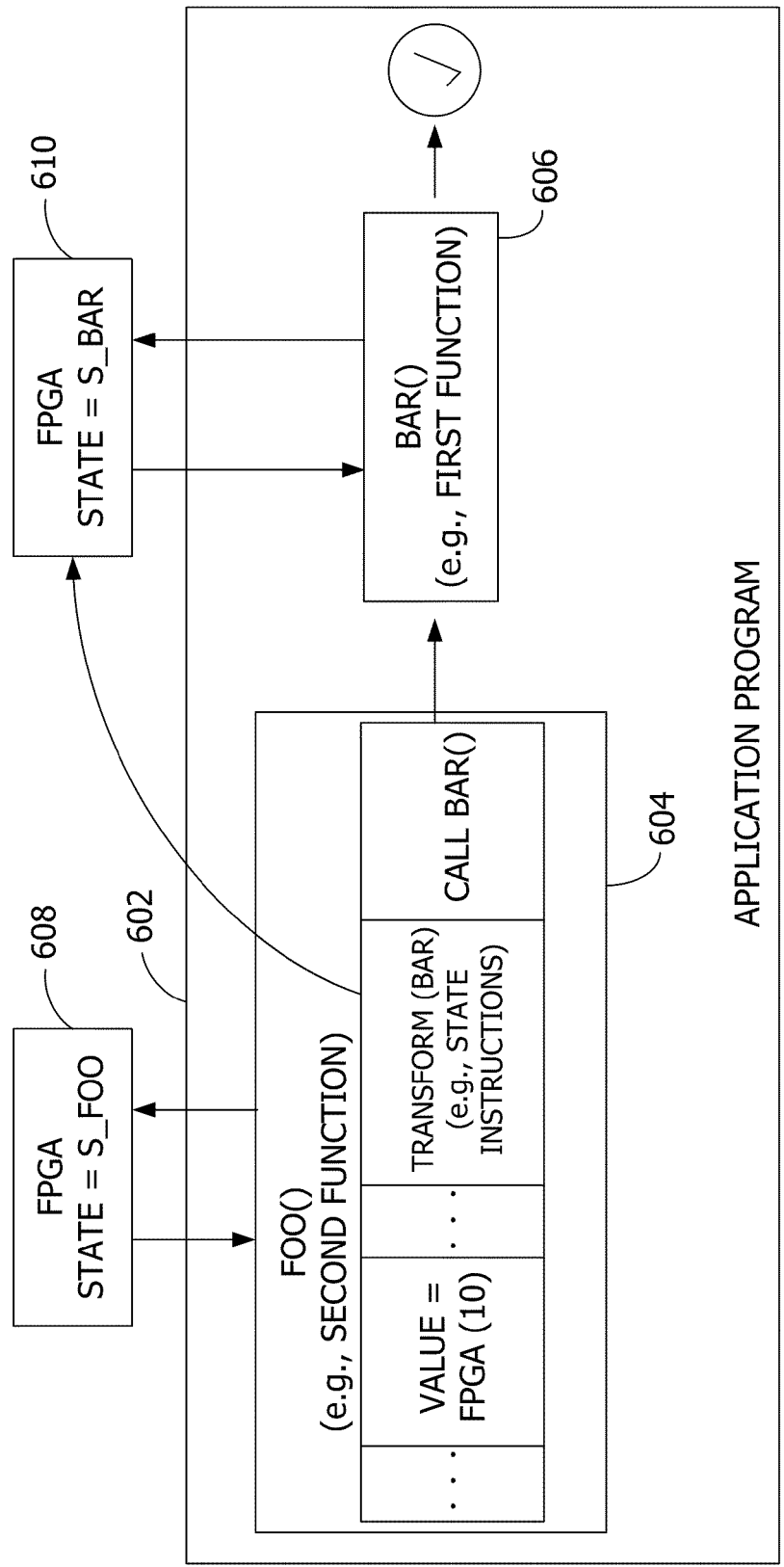
FIG. 6 is an exemplary block diagram illustrating the state transformation of a hardware component by one function prior to calling another function.

Referring next to FIG. 6, an exemplary block diagram illustrates the state transformation of hardware components by one function (e.g., Foo( ) 604) prior to calling another function (e.g., Bar( ) 606). Similar to FIG. 5, FPGA 608 and 610 may be the same hardware component, or may represent different hardware components. For the purpose of illustrating the different states at different times, the FPGA 608 and FPGA 610 have different reference characters. In the example of FIG. 6, Foo( ) 604 and Bar( ) 606 are functions associated with an application program 602 and protected by FPGA 608, 610. Foo( ) 604 calls function Bar( ) 606.

As illustrated in FIG. 6, when Foo( ) 604 begins execution, FPGA 608 has a state of S_FOO. Because the current state of FPGA 608 matches the pre-defined expected state for Foo( ) 604, Foo( ) 604 executes correctly (e.g., as indicated by the original or unprotected version of the application program 602). Foo( ) 604 includes several functions. For example, one function stores a value of 10 in FPGA 608, and later function Bar( ) 606 is called. However, prior to calling Bar( ) 606, state instructions embodied as a transform function are executed. The transform function transforms FPGA 610 into an expected state for Bar( ) 606 (e.g., S_BAR). In such an embodiment, the transform function identifies the expected state (e.g., from a lookup table or other memory area 304 using Bar( ) 606 as an index for example) and performs the state transformation.

After FPGA 610 has been transformed to have state S_BAR, Foo( ) 604 calls Bar( ) 606. Because the current state of FPGA 610 matches the pre-defined expected state for Bar( ) 606, Bar( ) 606 executes correctly (e.g., as indicated by the original or unprotected version of the application program 602). By linking the state of the hardware components for subsequent functions together (e.g., making the hardware state for one function dependent on the hardware state of a previous function), execution traces can be fixed. Further, if Foo( ) 604 is also a protected function, the modifications of the state for FPGA 610 may be based on the hardware state (e.g., S_FOO) assigned to Foo( ) 604.

Hardware State Signature

The state of the hardware components 108 may change over time as the application program 102 is executed. Embodiments of the invention observe the state changes in the hardware components 108 during the execution. For application programs 102 that have an ordered sequence of function calls, the state changes act as a signature, "fingerprint," or other characteristic of the execution. By monitoring the state changes and comparing the changes to known signatures, an embodiment of the invention identifies the particular application program 102 that is being executed. Identification of the application program 102 may enable customization of the application program 102 for a particular user, computing device 302, etc. Further, a signature corresponding to unauthorized or unintended execution of the application program 102 may also be stored. Embodiments of the invention compare the observed state changes to signatures corresponding to unauthorized execution to determine whether the application program 102 has been compromised. Alternatively or in addition, the observed state changes may also be analyzed to identify the particular functions 308 or instructions within the application program 102 that have been compromised.

By randomly generating the expected states of the hardware components 108 (e.g., randomly selecting the set of selected instructions or functions 308 and/or randomly assigning values to each member of the selected set), the states of the hardware components 108 may vary each time embodiments of the invention are applied to the application program 102. For example, if an embodiment is implemented via the tool 106 in FIG. 1, the tool 106 may operate on the same function 308 multiple times, with a different resulting signature or fingerprint each time.

Exemplary Operating Environment

A computer or computing device 302 302 such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for constraining execution of a selected function 308 to the identified hardware components 108, and exemplary means for protecting the selected function 308 from an unintended mode of execution.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for restricting execution of portions of an application program, said system comprising:
  a memory area for storing an application program, said application program having a plurality of functions associated therewith, said memory area being associated with a computing device, said computing device having one or more hardware components associated therewith, said memory area further storing one or more unauthorized hardware state signatures; and
  a processor programmed to:
    select a first function from the plurality of functions associated with the application program stored in the memory area;
    identify at least one of the hardware components;
    define an expected state for the identified hardware component;
    modify the selected first function to depend on the defined, expected state of the identified hardware component for execution;
    identify a second function from the plurality of functions, said identified second function calling the first function;
    modify the identified second function to transform an execution state of the identified hardware component into the defined expected state prior to calling the first function;
    observe a plurality of state changes to the identified hardware component during execution of the application stored in the memory area to define an observed hardware state signature;

compare the observed hardware state signature to the unauthorized hardware state signatures stored in the memory area; and execute the selected first function only if the identified hardware component has the defined, expected state and the observed hardware state signature does not match any of the unauthorized hardware state signatures based on the comparison.

2. The system of claim 1, wherein the hardware component comprises one or more of the following: a field-programmable gate array, a register, a trusted platform module, a programmable processor, a smartcard, a read-only-memory (ROM) chip, and a clock chip.

3. The system of claim 1, further comprising means for constraining execution of the selected first function to the identified hardware components.

4. The system of claim 1, further comprising means for protecting the selected first function from an unintended mode of execution.

5. A method comprising:
accessing instructions associated with an application program for execution on a computing device, said computing device having one or more hardware components associated therewith;
selecting at least one of the accessed instructions;
associating at least one of the hardware components with each of the selected instructions;
determining an expected state corresponding to each of the identified hardware components; and
modifying each of the selected instructions to depend on the expected state of the associated hardware components for execution,
observing a plurality of state changes to the identified hardware components during execution of the application to define an observed hardware state signature;
comparing the observed hardware state signature to one or more unauthorized hardware state signatures to identify a match;
preventing execution of the selected instructions based on the identified match; and
identifying, based on said comparing, at least one of the accessed instructions that has been compromised.

6. The method of claim 5, further comprising generating, for each of the selected instructions, state instructions that, when executed, transform an execution state of the associated hardware components into the corresponding expected state.

7. The method of claim 6, wherein generating the state instructions comprises generating state instructions that, when executed, generate a hash value and store the hash value in a register.

8. The method of claim 5, further comprising generating, for each of the selected instructions, state instructions that, when executed, confirm that the associated hardware components are in the corresponding expected state.

9. The method of claim 8, further comprising modifying the application program to include the generated state instructions.

10. The method of claim 9, further comprising identifying, for each of the accessed instructions, a function that calls the accessed instructions, and wherein modifying the application program comprises modifying the identified function to execute the generated state instructions.

11. The method of claim 5, wherein accessing the instructions comprises accessing source code for the application program.

12. The method of claim 5, wherein accessing the instructions comprises accessing object code for the application program.

13. The method of claim 5, wherein selecting at least one of the accessed instructions comprises randomly selecting at least one of the accessed instructions.

14. The method of claim 5, wherein a developer of the application program identifies one or more of the instructions, and wherein selecting at least one of the accessed instructions comprises selecting at least one of the identified instructions.

15. The method of claim 5, wherein determining the expected state comprises one or more of the following: assigning the expected state to the identified hardware components and generating a random state as the expected state.

16. One or more computer storage media having computer-executable modules for protecting an application program from an unintended mode of execution on a computing device, said application program having a plurality of functions associated therewith, said computing device having one or more hardware components associated therewith, said modules comprising:
an assignment module for associating at least one of the hardware components with a function from the plurality of functions, said function comprising one or more instructions;
a state module for:
observing execution of the application program to define a plurality of hardware states, and
defining an expected state for the hardware component associated with the function based on the hardware state associated with another function observed during the execution of the application program; and
a dependency module for modifying the function to:
observe a plurality of state changes to the hardware component during execution of the application to define an observed hardware state signature,
compare the observed hardware state signature to one or more unauthorized hardware state signatures,
execute the instructions only if an execution state of the hardware component is equivalent to the defined, expected state and the observed hardware state signature does not match any of the unauthorized hardware state signatures based on the comparison, and
otherwise, generate a notification.

17. The computer storage media of claim 16, wherein the dependency module further modifies the function to provide the generated notification to a user.

18. The computer storage media of claim 16, wherein the dependency module further generates state instructions that, when executed, transform the execution state of the hardware component into the expected state.

19. The computer storage media of claim 18, wherein the dependency module further modifies the application program to execute the state instructions prior to executing the function.

* * * * *